Figure 1:
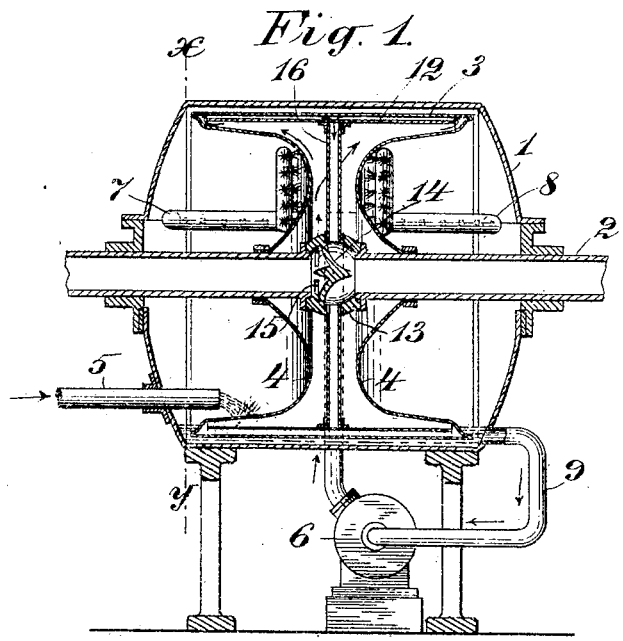

No. 764,995. PATENTED JULY 12, 1904.
M. EKENBERG.
APPARATUS FOR EVAPORATING LIQUIDS.
APPLICATION FILED NOV. 4, 1903.

NO MODEL.

WITNESSES:

INVENTOR
Martin Ekenberg
BY
Henry Cammett
ATTORNEY

No. 764,995.

Patented July 12, 1904.

UNITED STATES PATENT OFFICE.

MARTIN EKENBERG, OF STOCKHOLM, SWEDEN, ASSIGNOR TO MARTIN EKENBERGS AKTIEBOLAG, OF STOCKHOLM, SWEDEN.

APPARATUS FOR EVAPORATING LIQUIDS.

SPECIFICATION forming part of Letters Patent No. 764,995, dated July 12, 1904.

Application filed November 4, 1903. Serial No. 179,763. (No model.)

*To all whom it may concern:*

Be it known that I, MARTIN EKENBERG, a subject of the King of Sweden and Norway, and a resident of Odengatan 40, Stockholm, in the Kingdom of Sweden, have invented certain new and useful Improvements in Apparatus for Concentrating and Evaporating Liquids, of which the following is a specification, reference being had therein to the accompanying drawings.

This invention relates to an apparatus for concentrating emulsions, solutions, and the like in a vacuum or under ordinary atmospheric pressure simultaneously with evaporation, which is proceeded with to such an extent that a dry residue is obtained, which is collected as a useful final product. As an example of such manufacture, may be mentioned the evaporation of skim-milk in large quantities for the production of milk-powder, to which production the following description especially relates. The evaporation is effected in a pan, in which a suitably-heated rotating body is mounted and dips into the liquid, the peripheral speed of the said body being so regulated that a dry film is formed upon the surface of the same during the revolution, the said film being removed from this surface by means of suitable scrapers or the like. The temperature of the rotary body must not greatly exceed the boiling-point of the liquid, as the product may otherwise be damaged and the body must rotate slowly in order that the liquid taken up by its surface may have time to evaporate. The evaporation may be hastened by powerfully drawing off the generated vapor from the pan; but in spite of this no greater speed of the rotary body and a corresponding greater effect can be obtained. Although an evaporation resulting in dryness is certainly effected in the said manner, yet the evaporation will take place if no other means than those specified for effecting the same be employed comparatively slowly, as any preliminary concentrating of the liquid introduced into the pan will scarcely take place in the pan. Hitherto it has therefore been necessary, as a rule, in order to attain an appreciable effect per unit of heating-surface at the same time, in the question of milk, to preliminarily concentrate the liquid in a special apparatus, which fact has caused many disadvantages and unnecessary expense, or the wall of the pan has been provided with a heating device, in consequence of which a series of other disadvantages have arisen. In order to remove these disadvantages, an apparatus in accordance with this invention is employed, whereby without exterior heating heat is continually imparted to the liquid in the pan without taking into consideration the thin film being evaporated to a dry condition, the said heat being conducted to a surface of the same, which surface is continually being renewed. This is effected by the fact that the liquid through a circulating movement is continually caused to spread itself in a thin layer over such surfaces of the aforesaid rotary body, which need not or cannot be employed for the evaporating of the liquid to a dry condition. If thus for practical reasons—viz., in order to avoid the use of too large an apparatus—the surface of the rotary body cannot be made very large, the effect intended is still obtained—viz., by the liquid being brought into circulation and caused to flow constantly over the heated surface—so that the liquid surface is renewed at every moment. A preliminary concentration is thus not necessary, and the entire evaporating and drying process can be effected in one and the same apparatus. The apparatus is shown in the accompanying drawings.

Figure 2:
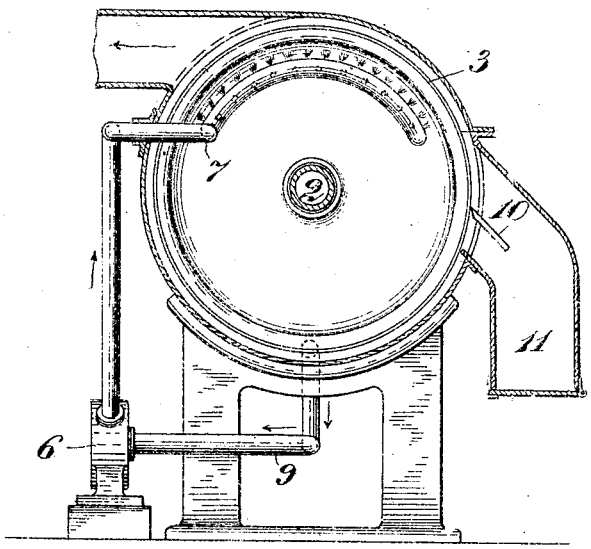

Figure 1 shows the apparatus in vertical section through the shaft of the rotary body, and Fig. 2 shows the same in vertical cross-section on the line $x\,y$ in Fig. 1.

In the pan 1 is rotatively mounted a hollow shaft 2, which carries the rotary body 3, consisting of a cylindrical drum with deeply bent-in or cupped end plates 4. Steam or other heating medium is led in through the shaft from the one end and out through the other, as shown by the arrows, so that the cylindrical part, as well as the end plates, are heated from within. In the rotary body is fitted a cylindrical partition-wall 12. This leaves an opening at each end against the inside of the body or is provided there with holes or the like, so that free communication exists from the one side to the other side of the same. The shaft 2 has an enlargement 13 and is within the latter divided by a partition or cross wall 14. On one side of the latter the shaft is provided with lateral openings 15 and on the other side with tubes 16, extending radially from the shaft and to which the wall 12 is fixed. These tubes put the inside of the shaft in communication with the chamber outside the wall 12 in the body. The heating medium passes into the drum through the openings 15, thence extends on both sides to the inside of the wall 12 and proceeds further over the edge of the wall 12 to the tubes 16. Through the tubes and shaft the heating medium escapes. The liquid to be evaporated is introduced through a pipe 5 by means of a pump or the like. The liquid introduced is kept in constant circulation by a rotary pump 6. The outlet-pipe extending from the latter is divided into two branches 7 8 outside the apparatus, which pipes enter the vessel and are so bent that they follow the shape of their respective plates 4, as shown in the drawings. The branches of the pipe are provided with a number of holes formed in the side facing the walls, through which the liquid in finely-spread jets issues toward the hot end plates 4, in order to run down the same and assemble on the bottom of the pan. The liquid passes from here back again to the pump through the tube 9 in order to be again sent into the apparatus, as shown by the arrows. The pipe 9 is placed at such a level that a part of the liquid remains on the bottom of the pan, into which the body 1 dips, as shown in Fig. 1. The evaporation to dryness takes place on the cylindrical outside surface of the rotary body 3 4, and the dry mass is scraped off by a scraper 10 and falls into a delivery-chamber 11. As stated above, the body 1 must not rotate faster than is necessary for the thin film taken up to be dried by the time it arrives at the scraper 10. Even if the liquid-level in the pan is so high that the end plates are also wet the coat of liquid on the latter effected, if required, by the aid of attached wings or the like should be very gently replenished or renewed. By means of the circulation device, consisting of the pump 6 and the pipe system 7 8 9, the change of liquid-supply is caused to take place from fifty to one hundred times faster under continuous supply of heat passing through the metal end plate. By this arrangement the same results are obtained as with a much larger apparatus not provided with such arrangements in spite of the apparatus not being heated from outside. If the apparatus is to be employed for concentration only, the body 3 4 is set in such rapid rotation that evaporation to a dry condition will not have time to take place, a suitable outlet for the concentrated liquid being provided.

The principal feature of the invention is the constant flowing of the circulating liquid over a free surface not used for evaporation to a dry condition, such as the side walls, the end walls, and the like of the heated rotary body. The means for effecting circulation can obviously be easily varied and arranged at different places—e. g., entirely within the receptacle. The liquid may also be spread on the cylindrical outside of the drum somewhat above the point where it comes up out of the liquid or dips into the same, in the latter case consequently after the drum has been freed from the dry mass.

Having now described my invention, what I claim as new, and desire to secure by Letters Patent, is—

1. An apparatus for concentrating a liquid substance in vacuum or under ordinary atmospheric pressure comprising a heated, rotating body, and means for continuously circulating said liquid and throwing it in jets onto the upper part of the hot surface of said body.

2. An apparatus for the purpose specified, having a rotating body 3, and circulating means with perforated branches from which the liquid to be concentrated is thrown on the rotating body.

3. An apparatus for the purpose specified, having a vacuum-pan 1, a rotating body 3 therein, and a circulating device, including a pump, for throwing the liquid on the surface of said rotating body.

4. An apparatus for the purpose specified, having a liquid-receptacle, a rotating body therein, means for heating said body, a circulating-pump 6, a pipe connecting said receptacle with one side of the pump, a pipe from the delivery side of the pump having perforated branches 7 and 8, said branches being disposed to discharge the liquid jet-like onto the surface of the rotating body, and a pipe which supplies the liquid to be condensed to the said receptacle.

In witness whereof I have hereunto signed my name in the presence of two subscribing witnesses.

MARTIN EKENBERG

Witnesses:
  AUG. SORENSEN,
  ERNST SVANQVIST.